July 14, 1964 G. HERZOG 3,140,852
ELECTRICALLY ACTUATED VALVE
Filed Jan. 18, 1960 2 Sheets-Sheet 1

3,140,852
ELECTRICALLY ACTUATED VALVE
Gustav Herzog, Feldmeilen, Zurich, Switzerland, assignor to Albert Lins, Zurich, Switzerland
Filed Jan. 18, 1960, Ser. No. 3,133
Claims priority, application Switzerland Jan. 19, 1959
4 Claims. (Cl. 251—11)

The present invention relates to an electrically actuated valve with a wet-vapour medium located in a closed space, the said medium remaining, within a predetermined temperature range, in the wet-vapour state and operating on a mobile valve member under spring pressure to adjust the same depending on its pressure. The wet-vapour medium is heated, by way of example, electrically in dependence on some temperature.

Valves of this type are known and designed mainly to control a medium in dependence on a physical variable of state. The valves are used, by way of example, for the purpose of keeping a flow of water at a constant or adjustable temperature. The current heating the wet-vapour medium may be applied or disconnected in dependence on the temperature of the water flow while the mobile valve member regulates the supply of cold or hot water.

In a known valve of the design described, a heat-insulated container is provided which is enwrapped by a heating wire for the purpose of heating the control medium held in the said container. If the rated temperature of the water must be lowered, the temperature of the wet-vapour medium must drop so that the force operative on the mobile valve member and, respectively, against the action of the spring is reduced. Owing to the fact that the heating element enclosing the container and the container itself must cool prior to the cooling of the wet-vapour medium, the dissipation of heat is at first very small so that the temperature of the operative medium drops only slowly and the desired change of temperature is consequently obtained only after a considerable delay. This large time constant is a disadvantage in many applications and often prevents an equilibrium from being obtained.

The valve according to the present invention largely eliminates this disadvantage. It is characterized by the fact that an electrical resistance heater is employed to heat the control medium.

The invention further relates to the application of this valve to the temperature-dependent return-flow control in hot-water heating systems.

The invention is here described in greater detail in conjunction with the drawing in which.

Figure 1:
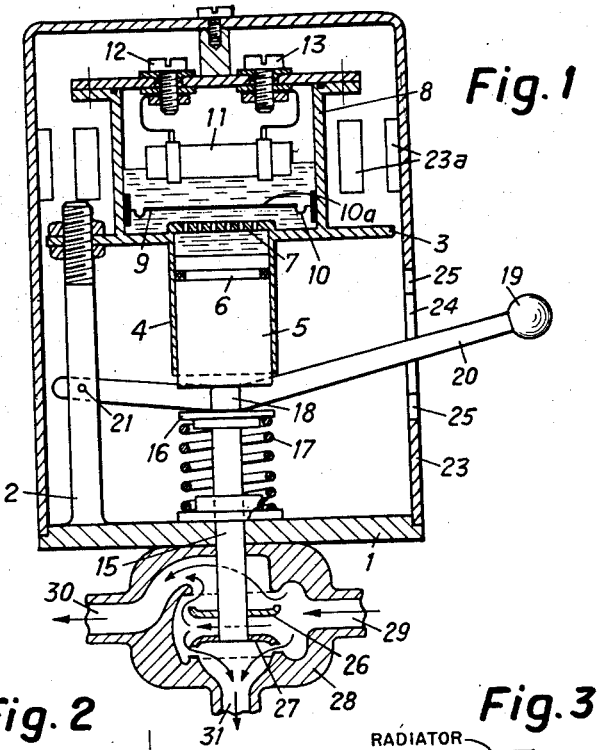
FIG. 1 is a longitudinal section of an electrically actuated valve.

In the valve according to FIG. 1, a base-plate 1 has mounted on it, as by three supports 2 of which only one is shown in FIG. 1, an overhead assembly 3 of which the distance can be adjusted. Attached to this assembly 3 is a tubular extension or cylinder 4 in which a piston 5 is longitudinally displaceable. The piston 5 may be sealed against the cylinder as by means of a gasket ring 6. The upper closure of the cylinder 4 is formed by a perforated plate 7. Arranged above the cylinder 4 is a container 8 divided into two compartments by a diaphragm generally designated 9. The diaphragm is preferably reinforced at the centre and resilient only around its edges, the said edges being bulged as shown at 10 in the drawing. The diaphragm 9 as indicated in the drawings is of a larger diameter than the piston 5. During a movement of the diaphragm vertical in the view according to FIG. 1, the bulge 10 unrolls.

The diaphragm 9 consists of a reinforced center portion 10a which is preferably a round rigid disc and an annular bead or bulge portion 10 which is of flexible metallic strip construction.

Above the diaphragm in the space 8 is an electrical resistance 11 connected to and held by supply pins 12 and 13. The compartment above the diaphragm 9 is filled with a wet-vapour medium which exercises a more or less strong pressure on the diaphragm 9 in dependence on its temperature.

The compartment below the diaphragm 9 is filled, by way of example, with water and designed to transmit the pressure from the diaphragm to the piston 5. The arrangement disclosed prevents the wet-vapour medium, such as hydrocarbon fluoride, from escaping through a leak in the piston.

Extending through the base-plate 1 is a pin 15 of which the top end is firmly connected with a plate 16. A spring 17 rests against the plate 16 and against the base-plate 1 in such a manner that the plate 16 is formed upwards.

Arranged between the piston 5 and the plate 16 is an intermediate member 18. The piston 5, the plate 16 and the intermediate member 18 therefore assume a position corresponding to the condition of equilibrium between the pressure of the wet-vapour medium and the spring.

Figure 2:
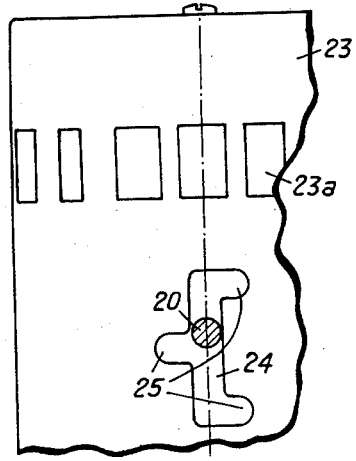
FIG. 2 is a side view of a portion of the valve shown in FIG. 1.

Attached to the intermediate member 18 is an arm 20 which may be pivoted to a support 2 at 21. On the right of the figure, the arm 20 ends in a handle 19. As also seen in FIG. 2, the housing 23 enclosing the device is provided with three recesses 25 laterally extending from a longitudinal slot 24. This arrangement enables the arm 20 to be locked in certain positions against the action of the spring 17. If the electrical control unit were to break down for some reason, the valve can readily be set by hand.

The pin 15 extends through the base-plate and carries, by way of example, a mobile valve member formed of two valve disks 26 and 27. Attached to the underside of the base-plate 1 is a valve body 28 provided with an inlet 29, and two outlets 30 and 31. The valve body 28 is so designed that the valve disk 27 closes the outlet 31 in one extreme position of the pin 15 so that the medium supplied to the inlet 29 can reach only the outlet 30, while in the other extreme position the disk 26 closes the outlet 30 so that the entire medium passes into the outlet 31.

In operation of the valve, the resistance 11 is supplied with a more or less strong current. The resistance correspondingly heats the operative medium held in the space 8. At the same time, however, heat is dissipated from the space 8. In order to ensure efficient cooling of the outer walls of the space by the surrounding air, windows 23a may be provided in the housing 23 to enable effective air exchange with the surrounding atmosphere to be obtained. After a relatively short time, a state of equilibrium has been reached, i.e. the amount of heat supplied by the resistance 11 is equal to the amount of heat dissipated by the walls of the space 8. The temperature corresponding to this state of equilibrium determines the pressure transmitted to the pin 15 via the diaphragm 9, the piston 5 and the intermediate member 18. When the current supplied through the resistance 11 is increased, the force counteracting that of the spring 17 will increase correspondingly. When the current is reduced, the outer walls of the space 8 rapidly dissipate more heat than supplied by the resistance so that the temperature of the operative medium in the space 8 drops. Owing to the efficient cooling of the outer walls of space 8, the time necessary to obtain a new state of equilibrium is relatively short.

The electrically actuated valve disclosed is particularly suited for thermostatic controls, the current heating the resistance 11 then being controlled in dependence on some temperature. Owing to the heating from the interior of the space holding the operative medium and thanks to the effective cooling of the outer wall of the said space by the surrounding air, a state of equilibrium is relatively rapidly obtained. The time necessary for this state of equilibrium to be obtained, however, also depends, in the individual case, on the time constant with which the controlled value operates on the temperature feeler controlling the current in the resistance 11.

Figure 3:
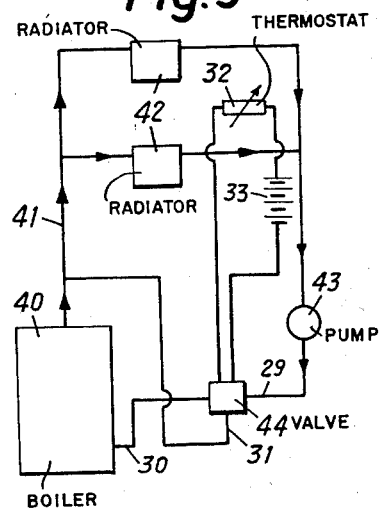
FIG. 3 is a diagrammatic view of a hot-water heating system.

FIG. 3 shows the diagram of a hot-water heating system, the thermostatic control being effected by means of the valve disclosed in FIGS. 1 and 2. The hot water leaves the heating unit or boiler 40 via a line 41 and passes to the radiators 42 whence it flows to a pump 43. The water then passes, via the supply line also designated by the reference numeral 29 in FIG. 1, to the valve here indicated at 44. In a proportion determined by the momentary temperature of the wet-vapour medium, the water then passes, for the purpose of being heated, through the outlet line 30 and into the boiler or back to the radiators 42 through the outlet 31. The larger the volume of water flowing into the boiler 40, the more strongly is the water supplied to the radiators 42 heated, and the more heat is radiated by the latter.

An adjustable temperature feeler or thermostat 32 regulates the current supplied from a current source 33 to the resistance 11. The temperature feeler 32 may be designed as a bimetallic contact or as a temperature-dependent resistance. When the outer temperature rises by way of example, the temperature feeler 32 becomes heated and the current passed through the resistance 11 is reduced. This causes the pressure of the wet-vapour medium to drop, which in turn enables the valve disks 26 and 27 to rise. This results in that a larger percentage of the water supplied by the pump 43 reaches the outlet 31 so that the radiators are supplied with, and radiate, less heat. If the temperature of the feeler 32 drops, the pressure of the wet-vapour medium is increased owing to greater heat emission of the resistance 11 so that the piston 5 is forced downward and enables more water to be returned to the heating duct.

A drawback of the valve disclosed in FIGS. 1 and 2 resides in the fact that the control chamber holding the control medium must be opened when the electrical resistance heater burns out and that the predetermined quantity of control medium must again be replaced subsequently, i.e. after the resistance has been replaced.

Figure 4:
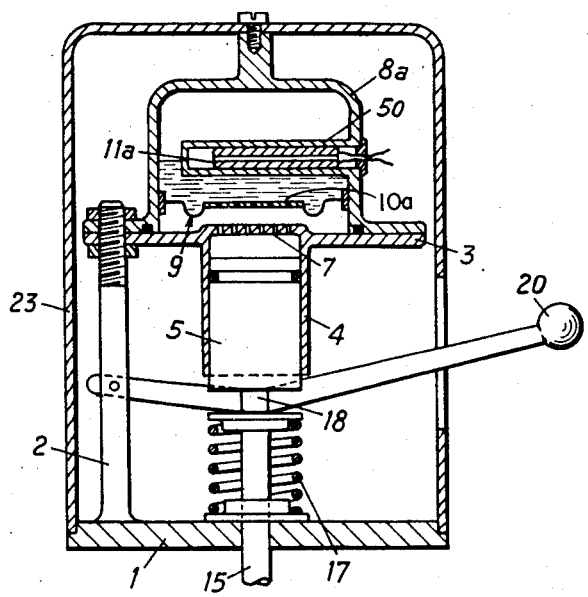
FIG. 4 is a longitudinal section of a further embodiment of a valve.

FIG. 4 shows the electrically actuated valve in the same view as that of FIG. 1, which, however, is free from the said disadvantage. Similar parts are designated by the same reference numerals as in FIG. 1.

By way of example, three supports are provided on a base-plate 1 (only one being shown), which carry on overhead assembly. Attached to this assembly in the same manner as in the valve according to FIG. 1 is a cylinder 4 which accommodates a longitudinally displaceable piston 5. The upper closure of the cylinder 4 is formed by a perforated plate 7. The piston is under the pressure of a spiral spring 17 which tends to push it upwards. Engaging the piston via an intermediate member 18 is a pin. A handle 20 for the manual adjustment of the pin 15 is connected with the said intermediate member 18. The pin 15 directly actuates the mobile valve members as may be seen from FIG. 1.

Screwed to the assembly 3 is a container 8a through which the diaphragm 9 extends. The diaphragm 9 is displaceable in the vertical direction. The space underneath the diaphragm 9 and above the piston 5 is filled with a hydraulic transmission medium, such as water. The space above the diaphragm 9 is filled with the control medium which remains in both the gaseous and the liquid state throughout the entire temperature range, i.e. which forms a two-phase system. The housing 23 is bolted to the housing 8a as shown.

Extending into the interior of the housing 8a from its side is a sleeve 50 of which the cross-section may be circular. This sleeve is sealed against the interior of the housing 8a and serves to accommodate the heating resistance 11a. The heating resistance 11a is preferably so dimensioned that it closely fits into the interior of the sleeve 50 so that there is practically no resistance to the passage of heat from the resistance to the sleeve. The sleeve 50 is preferably arranged so as to be in contact with the liquid component of the control medium at least in the major portion of the entire temperature range.

The arrangement disclosed enables the resistance 11a to be readily replaced after removal of the housing 23.

Having now particularly described and ascertained the nature of my said invention and in what manner the same is to be performed, I declare that what I claim is:

1. An electrically actuated valve comprising walls enclosing a chamber, a diaphragm stretched across said chamber having a central rigid disc portion and an annular bulging portion of flexible material, a tubular extension defined in a wall opposite said flexible diaphragm, a valve having a movable closure member, a piston of smaller diameter than said flexible diaphragm connected to said closure member and reciprocable in said tubular extension to actuate said movable closure member, means to bias said piston and said closure member, in a direction toward said flexible diaphragm, a liquid disposed in said chamber between said flexible diaphragm and said piston, a vaporizable liquid disposed in said chamber above said flexible diaphragm, electrical heater means disposed in said chamber containing said vaporizable liquid and heatable in increased intensity in proportion to current flow therethrough to vaporize the liquid in said chamber whereby to displace said flexible diaphragm in a direction toward said piston and move said piston and said closure member, and adjustable means for supporting said chamber walls and said tubular extension at a preselected height above said valve.

2. An electrically actuated valve according to claim 1, wherein said adjustable means includes a vertically elongated threaded stud member, one of said walls of said chamber being slidable on said stud member, and threaded nut means engaging said threaded stud to change the elevation of said wall means and said chamber.

3. An electrically actuated valve comprising walls enclosing a chamber, a diaphragm stretched across said chamber having a central rigid disc portion and an annular bulging portion of flexible material, a tubular extension defined in a wall opposite said flexible diaphragm, a valve having a movable closure member, a piston of smaller diameter than said flexible diaphragm connected to said closure member and reciprocable in said tubular extension to actuate said movable closure member, means to bias said piston and said closure member in a direction toward said flexible diaphragm, a liquid disposed in said chamber between said flexible diaphragm and said piston, a vaporizable liquid disposed in said chamber above said flexible diaphragm, electrical heater means disposed in said chamber containing said vaporizable liquid and heatable in increased intensity in proportion to current flow therethrough to vaporize the liquid in said chamber whereby to displace said flexible diaphragm in a direction toward said piston and move said piston and said closure member, a base plate mounted over said valve, said closure member being reciprocably mounted in said base plate, an upstanding stud disposed on said base plate and threaded at its upper end and extending through one of said walls of said chamber, threaded nut means threadably engaging said stud disposed on each side of said wall for changing the elevation of said chamber and a manual lever control member pivotally mounted on said stud intermediate its height and connected intermediate its length to said piston whereby said lever may be employed to manually control the operation of said valve closure member.

4. An electrically actuated valve according to claim 3, including a housing having a slot through which said lever extends, laterally offset portions defined along the length of said slot for locking said lever to orient said closure member at various valve opening and valve closing positions.

References Cited in the file of this patent

UNITED STATES PATENTS

| | | |
|---|---|---|
| 441,817 | Bell | Dec. 2, 1890 |
| 1,603,593 | Goodhue | Oct. 19, 1926 |
| 1,632,125 | French et al. | June 14, 1927 |
| 1,643,523 | Sauvage | Sept. 27, 1927 |
| 1,901,070 | Williams | Mar. 14, 1933 |
| 2,103,614 | Day | Dec. 28, 1937 |
| 2,129,482 | Severin | Sept. 6, 1938 |
| 2,211,573 | McGrath | Aug. 13, 1940 |
| 2,229,402 | Anderson | Jan. 21, 1941 |
| 2,272,099 | Smith | Feb. 3, 1942 |
| 2,751,152 | Ellenberger | June 19, 1956 |

FOREIGN PATENTS

| | | |
|---|---|---|
| 381,610 | Great Britain | Oct. 13, 1932 |
| 436,695 | Great Britain | Oct. 16, 1935 |
| 702,868 | France | Jan. 27, 1931 |
| 980,795 | France | Jan. 3, 1951 |